Oct. 28, 1952     J. S. SENESKY     2,615,287
GAS PRESSURE REGULATOR
Filed Oct. 1, 1948
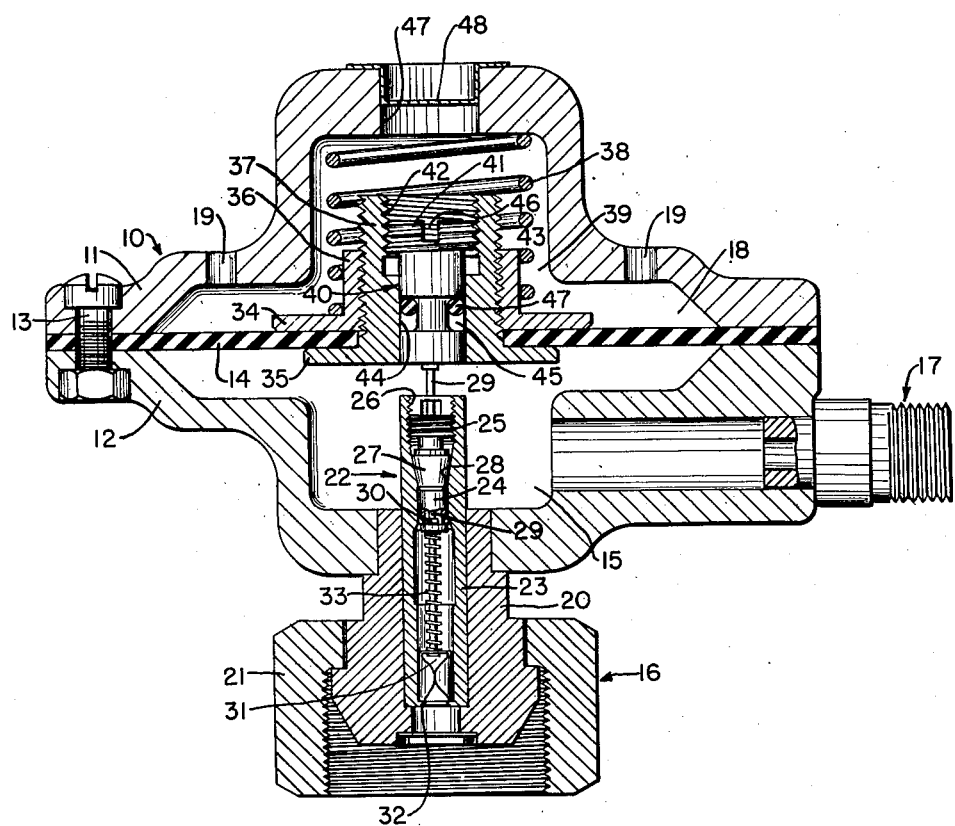
INVENTOR
JOHN S. SENESKY
BY
ATTORNEYS Patented Oct. 28, 1952

2,615,287

UNITED STATES PATENT OFFICE 2,615,287

GAS PRESSURE REGULATOR

John S. Senesky, Somerville, N. J., assignor to Air Reduction Company, Incorporated, a corporation of New York Application October 1, 1948, Serial No. 52,244

2 Claims. (Cl. 50—23)

This invention relates to gas pressure regulators.

There is a demand for a fixed pressure regulator having no such external delivery pressure adjusternal means for adjusting the delivery pressure. ing means and which is therefore simpler in construction and less expensive to manufacture and hence available at lower cost for use on occasions when variations of gas delivery pressure are not necessary, as, for instance, in simple welding operations. If such a pressure regulator were available it would especially benefit small shops which have only a limited need for the externally adjustable type of regulator or which cannot afford this more expensive type.

It is therefore one object of the present invention to provide a fixed pressure regulator that is simple in construction and inexpensive to manufacture.

While a pressure regulator made in accordance with the invention has no external means for adjusting the delivery pressure, it does have simple internal means which is adjusted at the time of manufacture of the regulator to thereafter deliver gas at a fixed predetermined pressure, this adjustment being needed to compensate for various manufacturing tolerances which would otherwise cause the regulator to deliver gas above or below the desired pressure. In the preferred form of the regulator the assembly of diaphragm-clamping members at the center of the regulator diaphragm has associated with it an additional member which is adjustable to shift its position relative to the assembly in a direction transverse to the plane of the diaphragm. The regulator valve element that is controlled by the diaphragm is operatively connected to this additional adjustable member whereby the degree of opening of the valve element for a given position of the diaphragm may be regulated by adjustment of the position of the additional member. Access to the additional member is obtained through an opening in the regulator casing, and after the adjustment is made at the time of manufacture of the regulator the opening is permanently closed by a suitable closure.

A pressure regulator embodying the invention is illustrated in the accompanying drawing, the single figure of which shows the regulator in vertical section.

The regulator comprises a casing 10 made up of an upper or bonnet section 11 and a lower or main section 12 having peripheral flanges bolted together by a circular series of bolts, only one of which appears at 13 in the drawing. A flexible diaphragm 14, made of suitable material such as rubber, is clamped at its periphery between the flanges of the casing sections in the usual way.

The diaphragm forms with the lower casing section 12 a gas chamber 15. The regulator casing has an inlet connection 16 through which gas may be admitted to the chamber 15, and an outlet connection 17 through which gas may be discharged from the chamber 15. The upper casing section is shaped to provide a space 18 above the diaphragm which allows the diaphragm to flex upwardly. This space is vented to the atmosphere by means of openings 19 in the upper casing section.

The inlet connection 16 includes a fitting 20 on which is rotatable an interiorly threaded nut 21. By means of this nut a hose or tube, leading from a source of gas whose pressure is to be reduced and regulated by the pressure regulator, may be connected to the fitting 20. The outlet connection 17 is adapted to be connected to a hose or tube leading to the point of consumption of the regulated gas.

The valve mechanism, which is denoted in general by the reference numeral 22, may be of a common commercially available type. It comprises a cylindrical shell 23 in which a small tube 24 is coaxially positioned. The tube 24 has an enlarged externally threaded portion 25 which is received by the internally threaded upper end portion 26 of the cylindrical shell 23. The tube 24 is screwed into the shell 23 until a downwardly and inwardly tapered portion 27 on the tube seats on a correspondingly tapered inner surface 28 on the shell 23. A valve stem 29 passes coaxially through the tube 24 and is provided with a portion 30 constituting a valve element which cooperates with the lower edge of the tube 24 constituting a valve seat. The valve stem is extended downwardly, as shown, through the cylindrical shell 23 and is guided at its lower end by a valve stem guide 31 having an opening through which the valve stem loosely passes. The valve stem guide 31 is supported by a shoulder 32 at the lower end of the cylindrical shell 23. A coil spring 33 encircles the valve stem and reacts at its lower end against the valve stem guide 31 and at its upper end against the under surface of an enlargement 33 on the valve stem thereby biasing the valve element 30 upwardly toward closed position.

The gas admitted through the inlet connection 16 tends to seat the valve element 30. The valve element is opened by downward movement of the valve stem 29 caused by downward displacement of the diaphragm 14 as hereinafter described. It should be understood, however, that the invention is applicable to regulators in which the valve element opens in the direction of gas flow into the regulator and is closed, rather than opened, by downward movement of the diaphragm.

The diaphragm 14 is clamped at its center portion between upper and lower clamping plates 34 and 35 respectively, the plate 34 having an internally threaded sleeve 36 which receives an externally threaded stud 37 on the plate 35. A coiled loading spring 38, accommodated by a recess 39 in the upper casing section 11, reacts at its lower end against the upper diaphragm-clamping plate 34 and at its upper end against the end wall of the recess 39. This spring is of specified length and resilience such that when it is positioned in the regulator it exerts a predetermined downward force on the diaphragm, depending upon the desired delivery pressure of the gas. The diaphragm-clamping plates 34 and 35, together with the threaded sleeve on one and the threaded stud on the other, constitute the diaphragm-clamping member assembly hereinbefore referred to, but any other similar assembly of parts functioning in the same manner, or any single member secured to the center portion of the diaphragm and functioning in the same manner, may be employed.

There is associated with the diaphragm-clamping member assembly an additional member 40 which is adjustable to shift its position relative to the assembly in a direction transverse to the plane of the diaphragm 14. In the preferred construction of the regulator this member has an externally threaded enlarged upper end 41 which is received by an internally threaded recess 42 in the upper end of the stud portion 37 of the diaphragm-clamping plate 35. The lower portion 43 of the member 40 is cylindrical and smooth-walled and fits loosely within a central smooth-walled opening 44 provided in the stud portion 37 of the lower diaphragm-clamping plate 35. When the member 40 is rotated it moves axially due to its threaded connection 41—42 with the stud 37. The smooth portion 43 of the member 40 has a circumferential groove 45 which receives an O-ring 47 made of rubber or the like and which cooperates with the wall of opening 44 in the stud 37 to provide a gas-tight seal which prevents gas from escaping from the gas chamber 15 around the adjustable member 40. The lower end of the adjustable member 40 bears upon the upper end of the valve stem 29 and is adapted to open the valve element 30 when the diaphragm 14 is displaced downwardly.

The adjustable member 40 has a slot 46 in its upper end adapted to receive the end of a screwdriver that may be inserted through an opening 47 provided in the upper casing section 11 above the adjustable member. After the member 40 is adjusted at the time of manufacture of the regulator the opening 47 is closed by a cap 48 which is pressed into place and intended as a permanent seal.

The regulator functions in the usual way to reduce the pressure of gas admitted to the regulator through the inlet connection 16 and to deliver the gas at a substantially constant reduced pressure through the outlet connection 17. In the original position of the diaphragm before gas pressure is exerted against it, the diaphragm is pressed downwardly by the action of the loading spring 38 so that the valve element 30 is in its open position. When gas is admitted to the gas chamber 15 the diaphragm is forced upwardly, and if the flow of gas is cut off downstream from the regulator the pressure will build up in the chamber 15 and continue to displace the diaphragm upwardly until the valve element 30 closes. When gas is being used downstream from the regulator the diaphragm will always move to a position in which the valve element is so positioned that the gas delivered to the chamber 15 produces a pressure therein which exerts a force against the lower face of the diaphragm that balances the downward force of the loading spring 38. The gas flows out of the outlet connection 17 at this pressure, which is the fixed delivery pressure of the regulator.

It is evident that the delivery pressure of the regulator is largely dependent upon the resilient effect of the loading spring 38 and the effective length of the valve stem, i. e. the distance from the valve element 30 to the diaphragm. If it were not for the adjustable member 40 these factors would have to be accurately calculated beforehand so that when gas is passing through the regulator and the diaphragm is in a balanced position the valve element will be opened the proper amount to deliver gas to the gas chamber 15 at a rate such that the desired delivery pressure of the regulator is maintained. However, it is extremely unlikely that these factors can be so accurately calculated beforehand that the regulator will have the desired delivery pressure when it is assembled. It is obvious, for instance, that normal manufacturing tolerances of the spring and the parts of the valve mechanism will cause the delivery pressure of the regulator to be somewhat different from that which it was desired the regulator should have. The adjustable member 40 affords means of compensating for these manufacturing tolerances. After the regulator is assembled and before it is shipped it is connected to a high pressure gas source and gas is withdrawn from the chamber 15 through the outlet connection 17 to simulate actual operating conditions. While the regulator is operating a screwdriver is inserted through the opening 47 in the upper casing section and the member 40 is adjusted until gas is delivered by the regulator at the desired delivery pressure. The effect of adjusting the member 40 is to vary the distance between the diaphragm and the valve element until constant withdrawal of gas from the regulator can be made at the desired delivery pressure of the regulator. For instance, if the valve stem 29 is slightly shorter than it should be so that the valve element tends to close before the required pressure in the gas chamber 15 is attained, the member 40 may be turned to move it downwardly until the distance between the valve element and the diaphragm is properly adjusted. If the loading spring 38 happens to be somewhat longer than necessary so as to produce an undersired increase in the delivery pressure of the regulator the member 40 may be adjusted upwardly to compensate for this and give the regulator the fixed delivery pressure it is intended to have. After the member 40 is adjusted in this fashion to give the regulator its proper delivery pressure the opening 47 is closed by forcing the cap 48 into it so that it cannot be readily removed.

I claim:

1. In a gas pressure regulator, a casing comprising a main section and a bonnet section, a diaphragm clamped between said sections, the main section having inlet and outlet connections, a valve element for controlling the admission of gas to the casing through the inlet connection, diaphragm-clamping members at the center portion of the diaphragm, the diaphragm clamping member assembly having an opening extending centrally therethrough, an additional member mounted in said opening and having threaded engagement with the diaphragm clamping member assembly, means operatively connecting said additional member to the valve element, rotation of said additional member serving by reason of its threaded engagement with the diaphragm clamping member assembly to shift its position relative to the assembly in a direction transverse to the plane of the diaphragm whereby the degree of opening of the valve for a given position of the diaphragm may be regulated, and a coil loading spring for the diaphragm in the bonnet section of the casing, said bonnet section having an opening in axial alignment with said additional member to afford access thereto while the regulator is in operation.

2. A gas pressure regulator according to claim 1 in which the upper portion only of the opening through the diaphragm clamping member is threaded; in which the additional member has a threaded upper portion operating in the threaded portion of said opening and a smooth-walled lower portion operating in the unthreaded lower portion of said opening, the smooth-walled lower portion of said additional member having a circumferential recess; and which includes an O-ring positioned in said recess and bearing against the adjacent wall of said opening to provide a gas seal.

JOHN S. SENESKY.

REFERENCES CITED

The following references are of record in the file of this patent:

UNITED STATES PATENTS

| Number | Name | Date |
|---|---|---|
| 473,069 | Giessenbier | Apr. 19, 1892 |
| 734,993 | Stewart | July 28, 1903 |
| 2,404,547 | Strid | July 23, 1946 |

FOREIGN PATENTS

| Number | Country | Date |
|---|---|---|
| 176,257 | Great Britain | Mar. 9, 1922 |
| 682,675 | Germany | Oct. 20, 1939 |